United States Patent
Shichi et al.

(10) Patent No.: US 11,231,028 B2
(45) Date of Patent: Jan. 25, 2022

(54) METHOD OF DRIVING AN ATMOSPHERIC AIR PUMP IN A CAPILLARY ELECTROPHORESIS APPARATUS

(71) Applicant: ARKRAY, Inc., Kyoto (JP)

(72) Inventors: Naoto Shichi, Kyoto (JP); Daisuke Matsumoto, Kyoto (JP); Takanari Shigemitsu, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 217 days.

(21) Appl. No.: 16/172,390

(22) Filed: Oct. 26, 2018

(65) Prior Publication Data

US 2019/0128254 A1    May 2, 2019

(30) Foreign Application Priority Data

Oct. 30, 2017 (JP) .............................. JP2017-209704

(51) Int. Cl.
  *F04B 13/00* (2006.01)
  *F04B 51/00* (2006.01)
  (Continued)

(52) U.S. Cl.
  CPC .............. *F04B 43/04* (2013.01); *F04B 13/00* (2013.01); *F04B 41/00* (2013.01); *F04B 49/06* (2013.01);
  (Continued)

(58) Field of Classification Search
  USPC .................................................. 422/504, 505
  See application file for complete search history.

(56) References Cited

U.S. PATENT DOCUMENTS 4,154,669 A * 5/1979 Goetz .............. G01N 27/44721
  204/645
4,239,612 A * 12/1980 Goetz .................. G01N 27/447
  204/645

(Continued)

FOREIGN PATENT DOCUMENTS

| JP | 2001-212221 A | 8/2001 |
| JP | 2005-021621 A | 1/2005 |
| JP | 2016-176768 A | 10/2016 |

OTHER PUBLICATIONS

Extended European Search Report issued in EP 18 20 2861.3-1004 by the European Patent Office dated Mar. 15, 2019, which is related to U.S. Appl. No. 16/172,390.

(Continued)

*Primary Examiner* — Peter J Bertheaud
*Assistant Examiner* — Geoffrey S Lee
(74) *Attorney, Agent, or Firm* — Studebaker & Brackett PC

(57) ABSTRACT

A method of driving a pump is used in a pressure-applying apparatus, the apparatus including a flow passage, a pump configured to impart pressure into the flow passage, an opening and closing valve configured to open and close the flow passage, a pressure detector configured to detect pressure in the flow passage, and an atmospheric air open valve configured to open an interior of the flow passage to atmospheric air. The method includes driving the pump after closing the opening and closing valve and opening the atmospheric air open valve, and evaluating a state of the pump, based on one of: the pressure detected by the pressure detector at a time at which a predetermined time period has elapsed after closing the atmospheric air open valve, and a (Continued)

time from closing of the atmospheric air open valve until detection of a predetermined pressure by the pressure detector.

10 Claims, 10 Drawing Sheets

(51) Int. Cl.

| | | |
|---|---|---|
| *F04B 41/00* | (2006.01) | |
| *F04B 43/073* | (2006.01) | |
| *F04B 53/10* | (2006.01) | |
| *F04B 49/10* | (2006.01) | |
| *F04B 49/06* | (2006.01) | |
| *F04B 43/04* | (2006.01) | |
| *G01L 9/12* | (2006.01) | |
| *F04B 35/04* | (2006.01) | |

(52) U.S. Cl.
CPC ............ *F04B 51/00* (2013.01); *F04B 53/109* (2013.01); *F04B 53/1077* (2013.01); *G01L 9/125* (2013.01); *F04B 35/04* (2013.01); *F04B 49/065* (2013.01); *F04B 49/10* (2013.01); *F04B 2203/0202* (2013.01); *F04B 2203/0402* (2013.01); *F04B 2205/05* (2013.01); *F04B 2205/06* (2013.01); *F04B 2205/09* (2013.01); *F04B 2207/03* (2013.01); *F04B 2207/70* (2013.01)

(56) References Cited

U.S. PATENT DOCUMENTS

| | | | | | |
|---|---|---|---|---|---|
| 4,351,709 | A * | 9/1982 | Goetz | ............. | G01N 27/44721 |
| | | | | | 204/549 |
| 5,132,227 | A * | 7/1992 | Kelly | ................. | G01N 33/0047 |
| | | | | | 422/68.1 |
| 5,302,264 | A * | 4/1994 | Welch | ............. | G01N 27/44743 |
| | | | | | 204/452 |
| 5,457,626 | A * | 10/1995 | Wolze | ................... | F04B 49/065 |
| | | | | | 210/198.2 |
| 5,635,050 | A * | 6/1997 | Pentoney, Jr. | ... | G01N 27/44704 |
| | | | | | 204/453 |
| 5,636,971 | A * | 6/1997 | Renedo Puig | ........ | F04B 49/022 |
| | | | | | 417/38 |
| 5,861,547 | A * | 1/1999 | Kawai | ................... | G01M 3/227 |
| | | | | | 73/40.7 |
| 6,048,496 | A * | 4/2000 | Zhou | ..................... | G01N 30/34 |
| | | | | | 210/198.2 |
| 6,318,817 | B1 * | 11/2001 | Martin | .................... | B60T 7/042 |
| | | | | | 303/116.1 |
| 6,374,193 | B1 * | 4/2002 | Kutscher | ............ | B60G 17/0152 |
| | | | | | 303/57 |
| 6,394,759 | B1 * | 5/2002 | Parce | .................. | B01L 3/50273 |
| | | | | | 417/48 |
| 6,568,426 | B1 * | 5/2003 | Chapman | ................ | F04B 49/02 |
| | | | | | 137/335 |
| 6,921,253 | B2 * | 7/2005 | Shuler | .................. | F04B 43/043 |
| | | | | | 417/413.2 |
| 7,241,115 | B2 * | 7/2007 | Luongo | ................... | F04B 51/00 |
| | | | | | 340/605 |
| 7,363,127 | B2 * | 4/2008 | Fogelstrom | ............ | B60T 13/26 |
| | | | | | 60/611 |
| 8,794,929 | B2 * | 8/2014 | Anex | ................ | A61M 5/14526 |
| | | | | | 417/48 |
| 10,086,672 | B2 * | 10/2018 | Ohashi | .............. | B60G 17/0523 |
| 10,598,174 | B2 * | 3/2020 | Ohkubo | ................. | F04B 35/04 |
| 2003/0052007 | A1 * | 3/2003 | Paul | ....................... | G01N 30/34 |
| | | | | | 204/450 |
| 2004/0261492 | A1 | 12/2004 | Zarkar et al. | | |
| 2005/0147508 | A1 * | 7/2005 | Luongo | .................. | F04B 51/00 |
| | | | | | 417/415 |
| 2005/0273227 | A1 * | 12/2005 | Fogelstrom | ............ | B60T 17/22 |
| | | | | | 701/33.4 |
| 2006/0123920 | A1 | 6/2006 | Tison et al. | | |
| 2007/0012098 | A1 | 1/2007 | Sabelstrom et al. | | |
| 2009/0112504 | A1 | 4/2009 | Ding et al. | | |
| 2012/0308409 | A1 * | 12/2012 | Levine | ................... | F04B 19/22 |
| | | | | | 417/274 |
| 2013/0186471 | A1 | 7/2013 | Nagase et al. | | |
| 2014/0311131 | A1 | 10/2014 | Kondo et al. | | |
| 2017/0037842 | A1 * | 2/2017 | Ohkubo | .................. | F04B 49/08 |
| 2017/0158018 | A1 * | 6/2017 | Ohashi | .................. | F04B 49/06 |
| 2018/0223832 | A1 * | 8/2018 | Ren | ....................... | F04B 49/065 |
| 2019/0064125 | A1 * | 2/2019 | Ruegenberg | ............. | G01F 1/69 |
| 2020/0088213 | A1 * | 3/2020 | Tanaka | .................... | F04B 53/16 |

OTHER PUBLICATIONS

Communication pursuant to Article 94(3) EPC issued by the European Patent Office dated Sep. 7, 2020, which corresponds to European Patent Application No. 18 202 861.3-1004 and is related to U.S. Appl. No. 16/172,390.

The extended European search report issued by the European Patent Office dated Nov. 10, 2021, which corresponds to European Patent No. 21189726.9-1004 and is related to U.S. Appl. No. 16/172,390.

* cited by examiner

METHOD OF DRIVING AN ATMOSPHERIC AIR PUMP IN A CAPILLARY ELECTROPHORESIS APPARATUS

CROSS-REFERENCE TO RELATED APPLICATION

This application is based on and claims priority under 35 USC 119 from Japanese Patent Application No. 2017-209704 filed on Oct. 30, 2017, the disclosure of which is incorporated by reference herein.

BACKGROUND

Technical Field

The present disclosure relates to a method of driving a pump.

Background Art

Japanese Patent Application Laid-Open (JP-A) No. 2016-176768 describes a capillary electrophoresis apparatus in which a suction pump is connected to an end of a suction pipe retained on a cathode block. In the capillary electrophoresis apparatus, a sample can be sucked into the suction pipe by operating the suction pump.

In order to normally functionalize an apparatus using a pump, such as the capillary electrophoresis apparatus of JP-A No. 2016-176768, it is necessary to appropriately evaluate whether a state of an operation of the pump is proper.

SUMMARY

The present disclosure provides a method of driving a pump, by which a state of an operation of a pump can be evaluated.

A method of driving a pump according to a first aspect is a method used in a pressure-applying apparatus including a flow passage; a pump configured to impart pressure into the flow passage; an opening and closing valve that is disposed in the flow passage, and that is configured to open and close the flow passage; a pressure detector configured to detect pressure in the flow passage; and an atmospheric air open valve that is disposed in the flow passage, and that is configured to open an interior of the flow passage to atmospheric air. The method includes driving the pump after closing the opening and closing valve, and opening the atmospheric air open valve; and evaluating a state of the pump, based on one of, the pressure detected by the pressure detector at a time at which a predetermined time period has elapsed after closing the atmospheric air open valve while continuing to drive the pump, and a time from closing of the atmospheric air open valve while continuing to drive the pump until detection of a predetermined pressure by the pressure detector.

In the method of driving a pump according to the first aspect, the opening and closing valve is closed. Further, the atmospheric air open valve disposed in the flow passage is opened. Furthermore, driving of the pump causes air in the flow passage to be pushed out, thereby equalizing pressure in the flow passage to atmospheric pressure. As a result, the pressure in the flow passage, detected by the pressure detection unit, becomes zero.

The pressure in the flow passage is increased when closing the atmospheric air open valve in a state in which the pressure in the flow passage is zero, while continuing to drive the pump. Then, the pressure detection unit detects pressure at the time at which the predetermined time period has elapsed after closing the atmospheric air open valve.

In a case in which the pressure at the time at which the predetermined time period has elapsed is lower than reference pressure, it can be determined that it is necessary to adjust the pump, or the pump is degraded. Further, in a case in which the pressure at the time at which the predetermined time period has elapsed is higher than the reference pressure, it can also be determined that it is necessary to adjust the pump.

As described above, the evaluation of the pump by using the pressure detection unit which detects pressure in the flow passage rather than by using a flow meter which directly measures an ability (e.g., a flow rate) of the pump enables a compact pressure-applying apparatus to be formed at a low cost.

A method of driving a pump according to a second aspect is based on the method of driving a pump according to the first aspect, such that the evaluating the state of the pump is based on the pressure and includes calculating a flow rate of air discharged from the pump based on the pressure detected by the pressure detector.

In the method of driving a pump according to the second aspect, the flow rate of air discharged from the pump is calculated from the pressure detected at evaluating the state of the pump based on the pressure. Then, in a case in which the flow rate is less than a reference flow rate, it is determined that it is necessary to adjust the pump, or the pump is degraded.

A method of driving a pump according to a third aspect is based on the method of driving a pump according to the first aspect or the second aspect, such that the evaluating the state of the pump is based on the pressure and includes determining that an error has occurred when a deviation between the pressure detected by the pressure detector and a reference pressure is more than a threshold value.

In the method of driving a pump according to the third aspect, it is determined that an error has occurred in a case in which the deviation between the pressure detected at evaluating the state of the pump based on the pressure and the reference pressure is more than a predetermined threshold value. As a result, continuous use of a degraded pump can be suppressed.

A method of driving a pump according to a fourth aspect is based on the method of driving a pump according to any one of the first aspect to the third aspect, such that the evaluating the state of the pump is based on the pressure and includes stopping the pump at a time at which a predetermined time has elapsed, and detecting the pressure more than once by the pressure detector.

In the method of driving a pump according to the fourth aspect, it is possible to measure pressure in the flow passage more than once at the time at which the predetermined time has elapsed after closing the atmospheric air open valve. Therefore, a measurement error of the pressure detection unit can be reduced, thereby improving precision of measurement of pressure.

A method of driving a pump according to a fifth aspect is based on the method of driving a pump according to any one of the first aspect to the third aspect, such that the evaluating the state of the pump is based on the pressure and includes detecting the pressure in the flow passage by the pressure detector more than once, and estimating a time at which an increase in the pressure in the flow passage started based on a change of measurement value with respect to time.

A time lag may occur between a time of closing the atmospheric air open valve and a time of starting an increase in pressure of the flow passage. In a case in which the time lag is long, an error occurs between the pressure of the flow passage at a time at which a predetermined time has elapsed after closing the atmospheric air open valve and the pressure of the flow passage at a time at which a predetermined time has elapsed after starting an increase in pressure of the flow passage.

Thus, in the method of driving a pump according to the fifth aspect, an increment of pressure with respect to elapsed time, i.e., a gradient can be calculated, thereby estimating a time of starting an increase in the pressure of the flow passage by measuring the pressure of the flow passage more than once. As a result, pressure in the flow passage at a time at which a predetermined time has elapsed after starting an increase in the pressure of the flow passage can be estimated.

A method of driving a pump according to a sixth aspect is based on the method of driving a pump according to any one of the first aspect to fourth aspect, such that the pressure-applying apparatus includes an adjustment flow passage that is connected to the flow passage, and that is configured to communicate with an enclosed air chamber; and an adjustment valve that is disposed in the adjustment flow passage, and that is configured to open and close the adjustment flow passage. In the method, the driving the pump includes operating the pump in a state in which the adjustment valve is opened.

In the method of driving a pump according to the sixth aspect, a volume of the entire flow passage (i.e., an enclosed space formed by the flow passage, a pressurization flow passage, and the adjustment flow passage) is increased by allowing the flow passage to communicate with the enclosed air chamber. As a result, an increase in pressure due to the pump slows down. Therefore, the pressure of the flow passage at a time at which a predetermined time has elapsed after closing the atmospheric air open valve and the pressure of the flow passage at a time at which a predetermined time has elapsed after starting an increase in pressure in the flow passage can be approximated to each other even in a case in which a time lag occurs between a time of closing the atmospheric air open valve and a time of starting an increase in pressure of the flow passage.

A method of driving a pump according to a seventh aspect is based on the method of driving a pump according to any one of the first aspect to the third aspect. The method includes evaluating the state of the pump is based on the time from the closing of the atmospheric air open valve while continuing to drive the pump until detection of the predetermined pressure by the pressure detector.

In the method of driving a pump according to the seventh aspect, it is determined that it is necessary to adjust the pump, or the pump is degraded, in a case in which a time at which predetermined pressure is detected is later than a presumed time. It is also determined that it is necessary to adjust the pump, in a case in which a time at which the predetermined pressure is detected is earlier than the presumed time.

A method of driving a pump according to an eighth aspect is based on the method of driving a pump according to any one of the first aspect to the sixth aspect. The method includes adjusting a driving condition of the pump, based on the state of the pump, as evaluated by the evaluating state of the pump based on the pressure.

In the method of driving a pump according to the eighth aspect, a driving condition of the pump is adjusted in a case in which the pressure at a time at which a predetermined time has elapsed is lower than the reference pressure, and it is determined that it is necessary to adjust the pump, or the pump is degraded. For example, a voltage applied to the pump is corrected to adjust the pressure, or driving of the pump is stopped. Further, the voltage applied to the pump is corrected to adjust the pressure in a case in which the pressure at a time at which a predetermined time has elapsed is higher than the reference pressure, and it is determined that it is necessary to adjust the pump.

A method of driving a pump according to a ninth aspect is based on the method of driving a pump according to the seventh aspect. The method includes adjusting a driving condition of the pump based on the state of the pump as evaluated by the evaluating the state of the pump based on the time.

In the method of driving a pump according to the ninth aspect, a voltage applied to the pump is corrected to adjust the pressure, or driving of the pump is stopped, in a case in which a time at which the predetermined pressure is detected is later than the presumed time, and it is determined that it is necessary to adjust the pump, or the pump is degraded. Further, the voltage applied to the pump is corrected to adjust the pressure in a case in which a time at which the predetermined pressure is detected is earlier than the presumed time, and it is determined that it is necessary to adjust the pump.

A method of driving a pump according to a tenth aspect is based on the method of driving a pump according to the eighth aspect or the ninth aspect, such that the driving condition of the pump is a voltage applied to the pump.

In the method of driving a pump according to the tenth aspect, a voltage applied to the pump is corrected to adjust the pressure in the flow passage. As a result, fluctuations in time for which the pump is driven can be suppressed in comparison with, for example, a case of correcting time for which the pump is driven.

A method of driving a pump according to an eleventh aspect is based on the method of driving a pump according to any one of the eighth aspect to the tenth aspect. The method includes measuring an environmental temperature of an environment in which the pressure-applying apparatus is placed; and adjusting a driving condition of the pump, based on the environmental temperature.

In the method of driving a pump according to the eleventh aspect, variations in performance of the pump due to an environmental temperature can be suppressed by adjusting a driving condition of the pump depending on the environmental temperature of the environment in which the pressure-applying apparatus is placed.

A method of driving a pump according to a twelfth aspect is based on the method of driving a pump according to any one of the first aspect to the eleventh aspect, such that the pressure-applying apparatus is placed in an analysis apparatus configured to analyze a diluted sample, and the flow passage is connected to a liquid tank in which a dilution liquid is enclosed, and the driving the pump supplies the pressure to the liquid tank to push the dilution liquid out of the liquid tank to dilute the sample.

The pressure-applying apparatus to which the method of driving a pump according to the twelfth aspect is applied is placed in the analysis apparatus for analyzing a diluted sample. Then, the pressure-applying apparatus supplies pressure to the liquid tank in which the dilution liquid is enclosed. As a result, the dilution liquid is pushed out of the liquid tank and dilutes the sample. Appropriate dilution of the sample requires control of a speed at which the dilution liquid is pushed out. To that end, it is necessary to keep an appropriate state of an operation of the pump.

According to the method of driving a pump according to the present disclosure, a state of an operation of the pump can be evaluated.

BRIEF DESCRIPTION OF THE DRAWINGS

Exemplary embodiments of the present disclosure will be described in detail based on the following figures, wherein.

DETAILED DESCRIPTION

First Embodiment

A pump of which the state of the operation is evaluated by a method of driving a pump according to a first embodiment is used in, for example, a pressure-applying apparatus placed in the interior of an analysis apparatus for analyzing the amount of glycated hemoglobin contained in blood. The blood is an example of a sample, and may also be referred to as a specimen. The glycated hemoglobin is an example of a substance to be analyzed by the analysis apparatus.

<Analysis Apparatus (External Configuration)>

Figure 8:
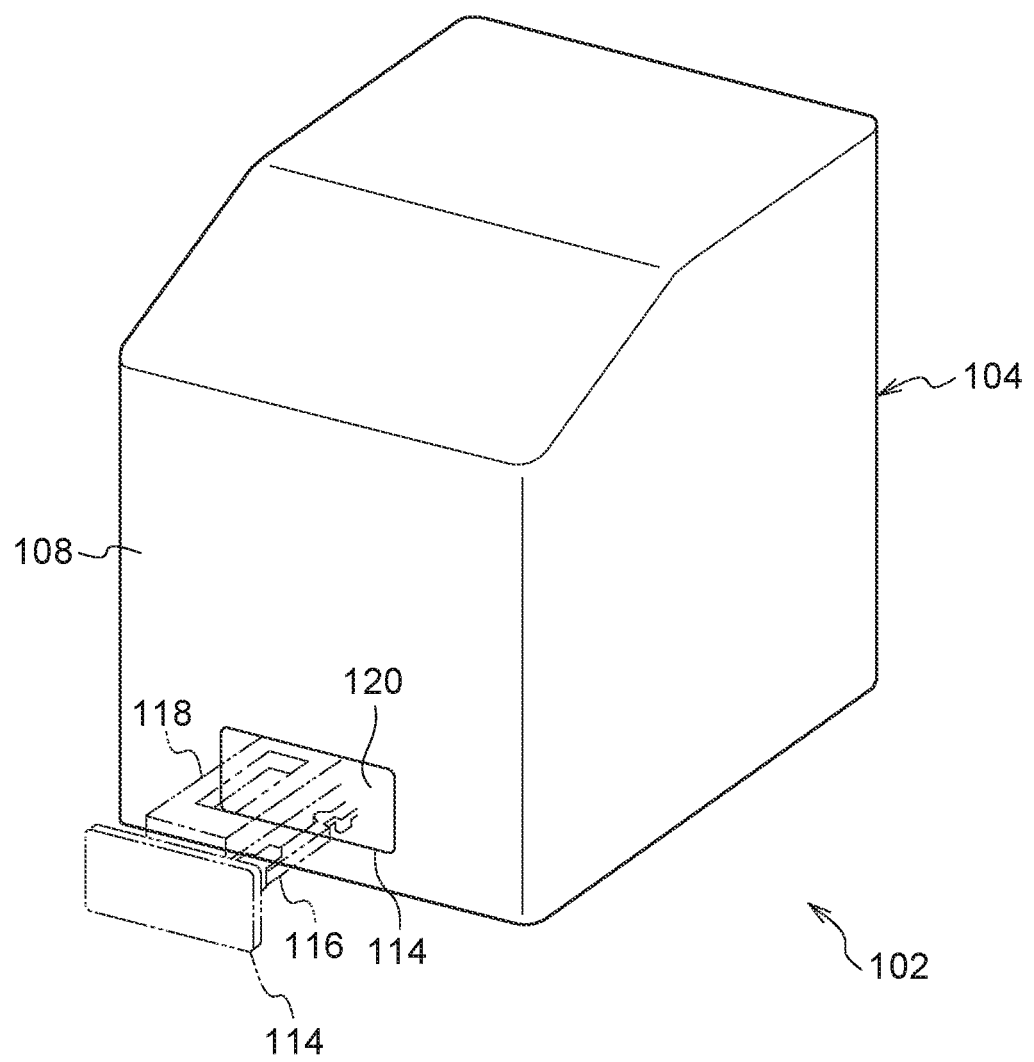
FIG. 8 is a perspective view illustrating the appearance of an analysis apparatus in which a pressure-applying apparatus to which a method of driving a pump according to an embodiment of the present disclosure is applied is placed.

As illustrated in FIG. 8, an analysis apparatus 102 includes a housing 104. In the present embodiment, the housing 104 is formed in a roughly rectangular parallelepiped box shape.

A touch panel which is not illustrated is disposed on the housing 104. An analysis operator can operate the analysis apparatus 102 by touching the touch panel while referring to information indicated on the touch panel.

A printer which is not illustrated is disposed in the housing 104. The analysis apparatus 102 can print, with the printer, the result of the analysis of a sample.

An opening and closing lid 114 is disposed on a front surface 108 of the housing 104. The opening and closing lid 114 can slide between a protrusion position (indicated by a chain double-dashed line) to which the opening and closing lid 114 moves frontward by an opening and closing mechanism 116 and an accommodation position (indicated by a continuous line) to which the opening and closing lid 114 moves backward into an opening 120, to flush with the front surface 108. A tray 118, together with the opening and closing lid 114, is exposed from the front surface 108 of the housing 104 in a state in which the opening and closing lid 114 is at the protrusion position. An analysis tool 42 (see FIG. 2) including a specimen (sample) can be put on the tray.

<Pressure-Applying Apparatus>

Figure 1:
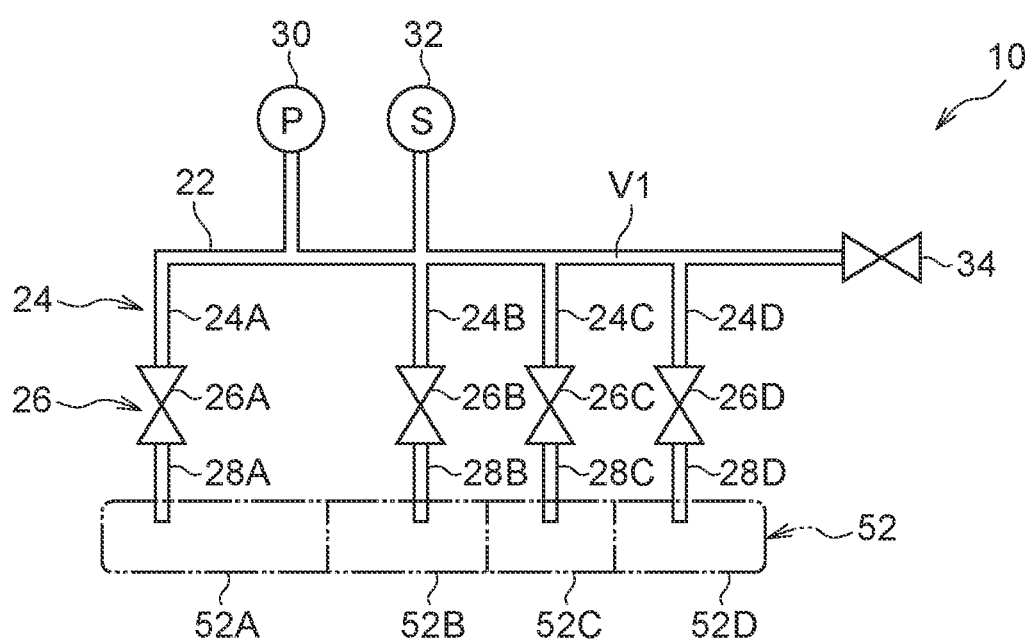
FIG. 1 is a configuration view illustrating a pressure-applying apparatus to which a method of driving a pump according to a first embodiment of the present disclosure is applied.

A pressure-applying apparatus 10 is placed in the interior of the analysis apparatus 102. As illustrated in FIG. 1, the pressure-applying apparatus 10 includes a flow passage 22; a pump 30 that applies pressure into the flow passage 22; and a pressure sensor 32 as a pressure detection unit that is disposed in the flow passage 22, and that detects pressure in the flow passage 22. The pressure-applying apparatus 10 further includes an atmospheric air open valve 34 that is disposed in the flow passage 22, and that opens the interior of the flow passage 22 to atmospheric air; pressurization flow passages 24 (pressurization flow passages 24A, 24B, 24C, and 24D) that are connected to the flow passage 22, and that supply pressure to liquid tanks 52 as pressure supply units; and opening and closing valves 26 (opening and closing valves 26A, 26B, 26C, and 26D) that are disposed in the pressurization flow passages 24, and that open and close the pressurization flow passages 24. The pressurization flow passages 24 are flow passages branching from the flow passage 22. The pressures of the interiors of the pressurization flow passages 24 and the flow passage 22, communicating with each other, are equal. The flow passage 22 and the pressurization flow passages 24 are examples of flow passages in the present disclosure.

<Analysis Tool>

Figure 2:
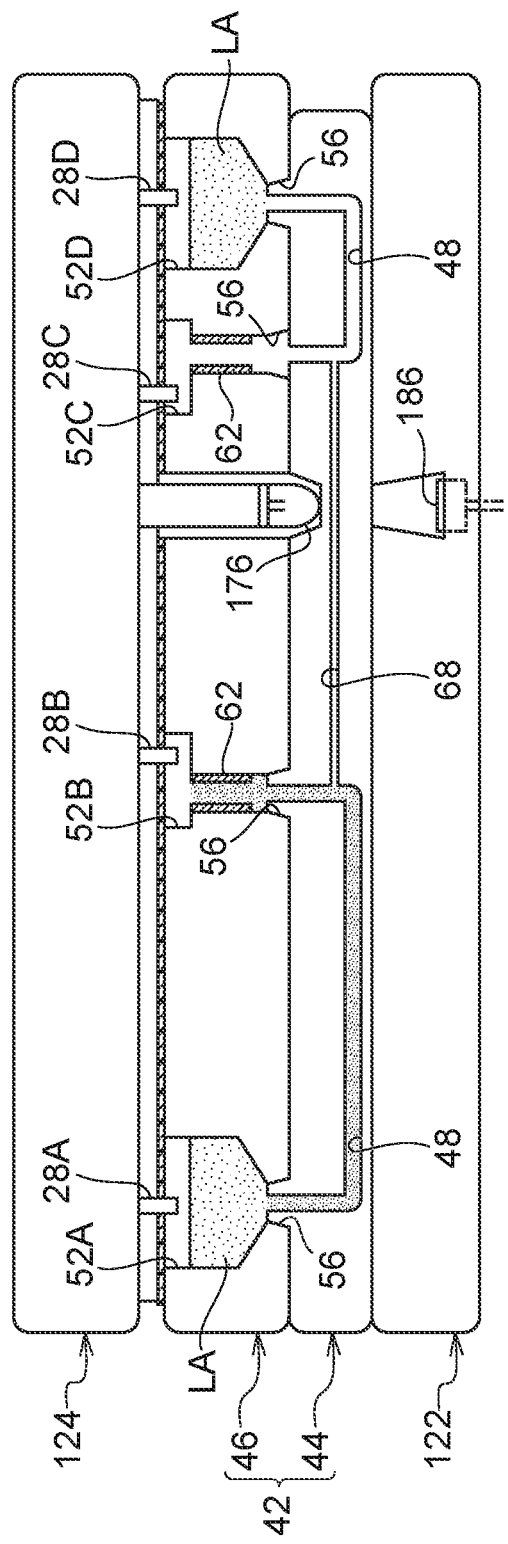
FIG. 2 is a configuration view illustrating a pressure supply unit in the pressure-applying apparatus to which the method of driving a pump according to the first embodiment of the present disclosure is applied.

The pressure-applying apparatus 10 applies pressure to the liquid tanks 52 (general term for liquid tanks 52A, 52B, 52C, and 52D) formed in the interior of the analysis tool 42 illustrated in FIG. 2. The analysis tool 42 is formed by combining a chip 44, in which plural flow passages 48 and a capillary 68 are formed, with a cartridge 46 in which the plural liquid tanks 52 are formed.

Communication units 56 communicating with the flow passages of the chip 44 are formed in the lower portions of the liquid tanks 52 of the cartridge 46. A liquid LA such as, for example, a dilution liquid or a migration liquid is enclosed in some of the plural liquid tanks 52. Among the plural liquid tanks 52, the capillary 68 is formed between the flow passages 48 corresponding to two certain communication units 56. The cross-sectional flow passage area of the capillary 68 is set to allow a liquid present in the flow passages 48 to flow due to a capillary phenomenon. Accordingly, the cross-sectional flow passage area of the capillary 68 is smaller than the cross-sectional flow passage area each of the flow passages 48. Electrodes 62 are disposed on the communication units 56 on both sides of the capillary 68. A sample (blood in the present embodiment) is filled in advance into any one of the flow passages 48 of the chip 44 before the combination with the cartridge 46.

Each of the ends of the plural flow passages 48 is allowed to communicate with the liquid tanks 52 by combining the chip 44 and the cartridge 46 with each other. The analysis tool 42 in which the chip 44 and the cartridge 46 are combined with each other is interposed and retained between a placement unit 122 and a press unit 124 in the interior of the analysis apparatus which is not illustrated. The placement unit 122 is a base on which the analysis tool 42 is put, and the press unit 124 is a fixture that fixes the analysis tool 42 to the placement unit 122. In such a state, plural connection ports 28 (general term for connection ports 28A, 28B, 28C, and 28D) protruding downward from the press unit 124 are inserted into the liquid tanks 52 (liquid tanks 52A, 52B, 52C, and 52D). The connection ports 28 are formed of hollow tubes, and connected to the pressurization flow passages 24, illustrated in FIG. 1, in the interior of the press unit 124. The driving of the pump 30, and the opening and closing of the opening and closing valves 26 of the pressurization flow passages 24 enable air to be introduced into the liquid tanks 52 from the connection ports 28 illustrated in FIG. 2, and enable the introduction of air to be stopped.

<Action of Pressure-Applying Apparatus>

An example of a driving method in normal operation of the pressure-applying apparatus 10 will be described. For example, the opening and closing valve 26A is opened, the opening and closing valves 26B, 26C, and 26D are closed (see FIG. 1), and the introduction (pressurization) of air into one liquid tank 52A is performed. As a result, the sample is diluted with the liquid LA, and the liquid is stirred and fed to the liquid tank 52B through a certain flow passage 48.

For example, the opening and closing valve 26D is opened, the opening and closing valves 26A, 26B, and 26C are closed (see FIG. 1), and the introduction (pressurization) of air into a liquid tank (the right liquid tank 52D in FIG. 2) different from the above-described liquid tank, and the like are performed. As a result, the liquid LA in the corresponding liquid tank 52D is filled into the flow passage 48 connected to the liquid tank 52D. The liquid is filled into the capillary 68 due to a capillary phenomenon.

Then, a predetermined voltage is applied between the electrodes 62. As a result, electrophoresis occurs in the capillary 68, and components contained in the sample are separated. The electrophoresed diluted sample is irradiated with light from an irradiation member 176, and the photo-characteristic (absorption, reflection, or the like) of the electrophoresed diluted sample is measured. In this case, an absorbance is detected by an absorbance sensor 186, and each of the components in the sample, separated in the capillary 68, is measured.

<Method of Adjusting Pump>

A method of adjusting the pump 30 will be described. The pump 30 is a pressure generation apparatus driven by electrical operation. In order to sufficiently dilute the sample in the normal operation of the pressure-applying apparatus 10 and to suppress excessive stirring, the state of the operation of the pump 30 is regularly evaluated, and the pump 30 is adjusted based on the evaluation. It may be impossible to normally measure the photo-characteristic due to bubbling of the sample in a case in which the sample solution is excessively stirred. Therefore, it is important to precisely control the flow rate of air fed by the pump 30. The frequency of the evaluation and adjustment operation is optional, and it is preferable to perform the evaluation and adjustment operation whenever normal operation is performed and just before the normal operation is started. Examples of the causes of varying the flow rate of air fed by the pump 30 to such a degree that it is impossible to normally measure the photo-characteristic include an individual difference in the pump 30, and the degradation of the pump 30.

In order to evaluate the state of the operation of the pump 30, first, the pump 30 is stopped, and the atmospheric air open valve 34 is opened in a state in which the opening and closing valves 26 (opening and closing valves 26A, 26B, 26C, and 26D) illustrated in FIG. 1 are closed. As a result, the pressure in the flow passage 22 and the pressurization flow passages 24 (24A, 24B, 24C, and 24D) is equalized to atmospheric pressure. In other words, the pressure is allowed to be zero (step S102 in FIG. 9).

Then, the pump 30 is driven while maintaining a state in which the opening and closing valves 26 are closed, and the atmospheric air open valve 34 is opened. Since the atmospheric air open valve 34 is opened, a state in which the pressure in the flow passage 22 is zero is maintained (step S104 in FIG. 9). The first step is an example of driving a pump after (i) closing an opening and closing valve, and (ii) opening an atmospheric air open valve of the present disclosure.

Then, the atmospheric air open valve 34 is closed. As a result, the pressure of the interior of the flow passage 22 and the pressurization flow passages 24 enclosed by the opening and closing valves 26 and the atmospheric air open valve 34 is increased (step S106 in FIG. 9). In the following description, an enclosed space communicating with the pump 30 may be referred to as an enclosed space V1.

Figure 9:
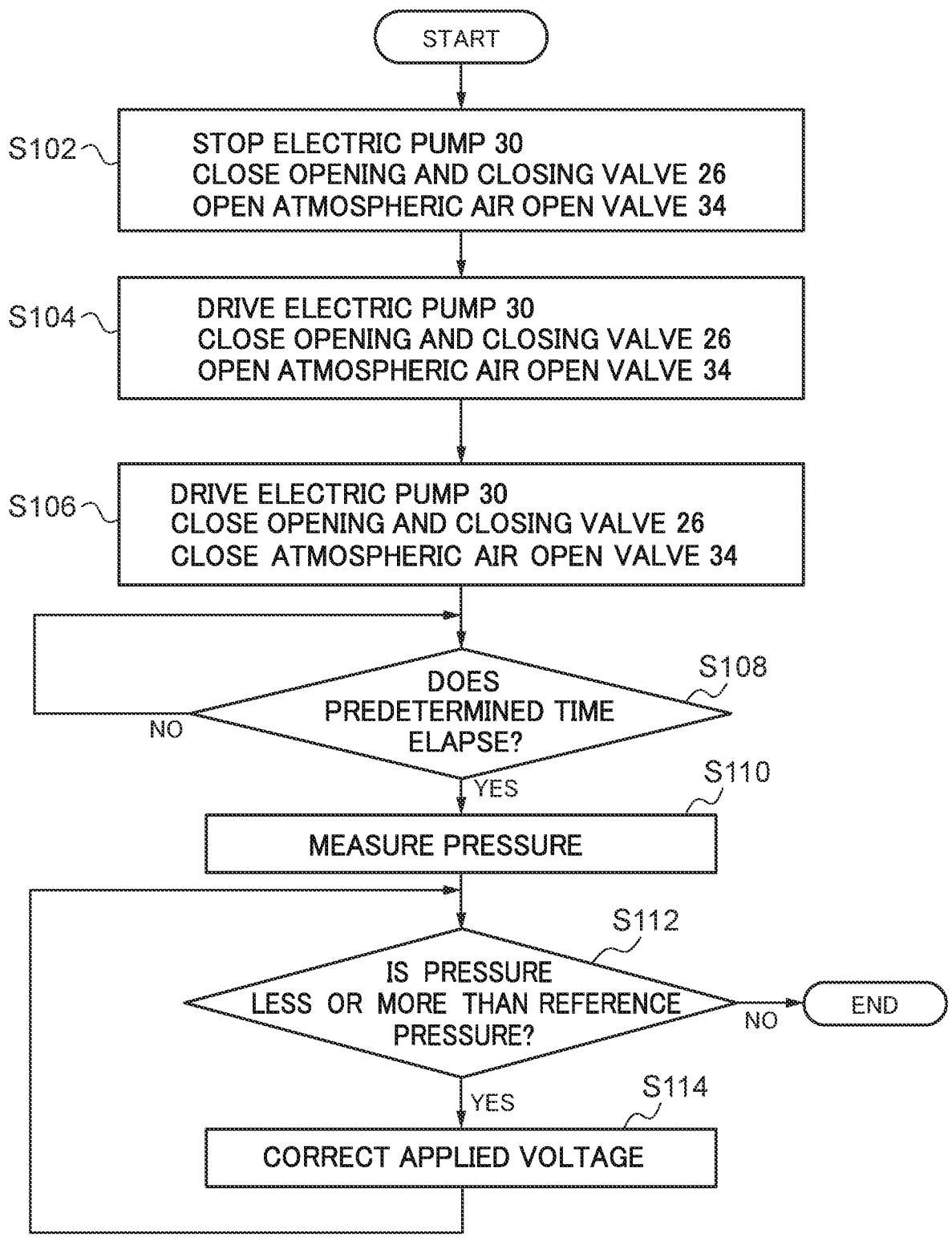
FIG. 9 is a flowchart indicating a method of adjusting a pump in a method of driving a pump according to an embodiment of the present disclosure.

Then, after a lapse of predetermined time (step S108 in FIG. 9) after closing the atmospheric air open valve 34, the pressure sensor 32 detects and records the pressure in the enclosed space V1 (the pressure in the flow passage 22 and the pressurization flow passages 24) (step S110 in FIG. 9). In such a case, any liquid is not included but only a gas exists in the enclosed space V1. Timing at which the pressure sensor 32 detects the pressure of the enclosed space V1 is set in advance. For example, in the present embodiment, the pressure of the enclosed space V1 is detected after a lapse of predetermined time after closing the atmospheric air open valve 34, as illustrated in step S108. The predetermined time (predetermined time t1 described later) is time from the start of an increase in the pressure in the enclosed space V1 to arrival at predetermined pressure P0 (driving pressure in normal operation) in a case in which the pump 30 is operating normally as expected.

Figure 3:
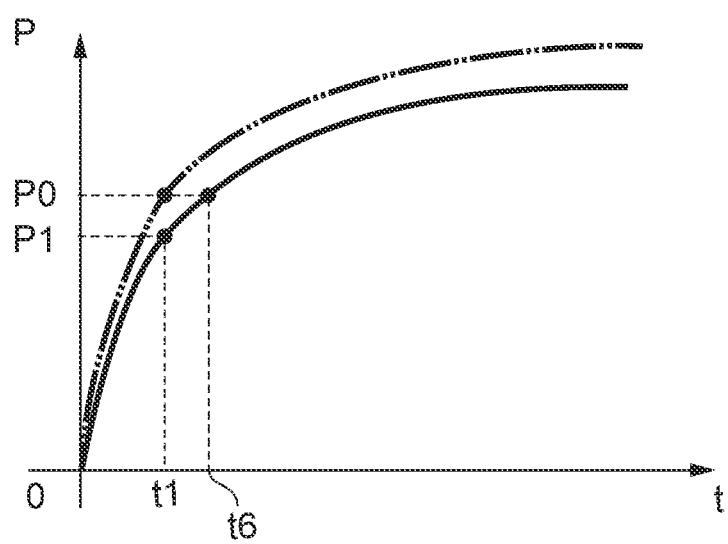
FIG. 3 is a graph indicating a relationship between elapsed time after closing an atmospheric air open valve and pressure in an enclosed space formed by a flow passage and a pressurization flow passage, in the method of driving a pump according to the first embodiment of the present disclosure.

In FIG. 3, a relationship between elapsed time t and the pressure P in the enclosed space V1 in the case of normally driving the pump 30 on the assumption that a time at which the atmospheric air open valve is closed is t=0 is indicated by a chain double-dashed line. A relationship between the elapsed time t and the pressure P in the enclosed space V1 in a case in which the pump 30 is not operating normally, i.e., pressure supplied to the liquid tanks 52 by the pump 30 deviates from reference pressure (normal value set in advance) is indicated by a continuous line.

As illustrated in FIG. 3, pressure P1 in the enclosed space V1 at the time of the lapse of the predetermined time t1 in the case of using the pump 30 requiring adjustment is lower than the pressure P0 in the enclosed space V1 at the time of the lapse of the predetermined time t1 in the case of using the pump 30 that is operating normally. In other words, the pressure supplied to the liquid tanks 52 by the pump 30 deviates from the reference pressure, and decreases. In a case in which the pressure is low, the amount of air fed to the liquid tanks 52 by the pump 30 becomes small, and therefore, the amount of liquid LA fed from the liquid tanks 52 also becomes small. In a case in which the pump 30 is used in such a state, for example, the dilution liquid and the sample may be prevented from being sufficiently mixed.

In FIG. 3, an example in which the pressure supplied to the liquid tanks 52 by the pump 30 is "lower" than the reference pressure is indicated. However, there will be cases when the pressure supplied to the liquid tank 52 by the pump 30 is lower than the reference pressure, and cases when it is higher. In such a case, the pressure in the enclosed space V1 at the time of the lapse of the predetermined time t1 is higher than the pressure P0. As a result, the amount of air fed to the liquid tanks 52 by the pump 30 becomes large, and therefore, the amount of liquid LA fed from the liquid tanks 52 also becomes large. In such a case, the dilution liquid and the sample may also be excessively stirred, thereby generating bubbles and the like unnecessary for analysis.

Accordingly, precise measurement is enabled by executing, if appropriate, a correction operation for allowing the pressure P1 in the enclosed space V1 at the time of the lapse of the predetermined time t1 to approach the pressure P0, and for allowing the flow rate of air fed to the liquid tank 52 to an appropriate value. Therefore, in a case in which the pressure supplied to the liquid tank 52 by the pump 30 is "lower" or "higher" than the reference pressure, as indicated in step S112 in FIG. 9, it is determined that the adjustment of the pump 30 is required (second step), and a voltage applied to the pump 30 is corrected to adjust the flow rate of air fed to the liquid tanks 52 by the pump 30, in order to allow the pressure P1 in the enclosed space V1 at the time of the lapse of the predetermined time t1 to approach the pressure P0 (step S114, fourth step in FIG. 9). The second step is an example of evaluating a state of a pump based on pressure of the present disclosure, while the fourth step is an example of adjusting a driving condition of the pump based on the state of the pump evaluated according to the pressure of the present disclosure.

For example, on the assumption that the flow rate of air supplied into the enclosed space V1 by the pump 30 at a time of normal operation is Y (mL/sec), the flow rate Y is represented using the pressure P (Pa) in the enclosed space V1 as follows.

$$Y = A \cdot P + B \quad \text{(Equation 1)}$$

Constants A (mL/sec·Pa) and B (mL/sec) in the (Equation 1) described above are constants determined by the kind of a pump, the length of a flow passage, the area of the flow passage, the presence or absence of a bend in the flow passage, and the like, and derived from a relationship between the flow rate Y and the pressure P detected in advance through an experiment or the like.

On the assumption that a flow rate caused by the pump 30 requiring adjustment is Y1 (mL/sec), the flow rate Y1 is calculated, as follows, by substituting the pressure P1 (Pa) detected by the pressure sensor 32 into the (Equation 1) described above.

$$Y1 = A \cdot P1 + B$$

In the adjustment operation, the flow rate Y1 is corrected to allow the flow rate Y1 to approach a flow rate Y0 caused by the pump 30 that is operating normally, by adjusting an applied voltage. On the assumption that the voltage applied to the pump is E (V), the voltage E is represented, as follows, using the flow rate Y (mL/sec).

$$E = C \cdot Y \quad \text{(Equation 2)}$$

Like the constants A and B, a constant C (V·sec/mL) in the (Equation 2) described above is a constant determined by the kind of a pump, the length of a flow passage, the area of the flow passage, the presence or absence of a bend in the flow passage, and the like, and derived from a relationship between the flow rate Y and the voltage E detected in advance through an experiment or the like. On the assumption that a flow rate (reference flow rate) in a state in which the pump 30 is operating normally is a flow rate Y0, a correction value $\Delta E$ of an applied voltage is calculated as follows.

$$\Delta E = C(Y0 - Y1)$$

In other words, the flow rate of air fed by the pump 30 requiring adjustment is calculated as the flow rate Y1 by using the pressure P1 detected by the pressure sensor 32, and (Equation 1). The correction value $\Delta E$ of the applied voltage is further calculated by using the flow rate Y1 and (Equation 2). A value (E1+$\Delta E$) obtained by adding the correction value $\Delta E$ to an applied voltage E1 before the adjustment is regarded as an applied voltage after the adjustment. As a result, the flow rate Y1 is corrected to the flow rate Y0.

<Action>

In the method of driving a pump according to the first embodiment, the state of the operation of the pump 30 can be evaluated in the above steps. The flow rate of air fed to the liquid tanks 52 by the pump 30 can be adjusted by adjusting a voltage applied to the pump 30. As a result, the flow rate of air in the enclosed space V1 can be adjusted without placing flow meters in the flow passage 22 and the pressurization flow passages 24. The placement of no flow meter results in a decrease in the number of components in the analysis apparatus, to allow a mechanism to be simplified, and therefore results in easy maintenance. The size of the analysis apparatus can be reduced, and a production cost can also be reduced. The influence of variations in flow rate due to an individual difference in the pump 30 and the degradation of the pump 30 can be suppressed.

In the analysis apparatus 102 to which the method of driving a pump according to the first embodiment is applied, the diluted sample is filled into the capillary 68 of the analysis tool 42. The pump 30 causes the stirring of the sample and the liquid LA such as a dilution liquid or a migration liquid, to generate the diluted sample filled into the capillary 68 having a small volume. In other words, the volume of the diluted sample is small, and the errors of the flow rate and pressure of the pump 30 have a large influence on measurement results. In the present embodiment, the pump 30 can be adjusted by the method described above.

Second Embodiment

In the method of driving a pump according to the first embodiment, the pressure in the enclosed space V1 at the time of the lapse of the predetermined time t1 after closing the atmospheric air open valve 34 while driving the pump 30 is measured. In contrast, the driving of a pump 30 is stopped at the time of a lapse of a predetermined time t1 in a method of driving a pump according to a second embodiment. A pressure sensor 32 further measures pressure in an enclosed space V1 more than once in a state in which the driving of the pump 30 is stopped.

Figure 4:
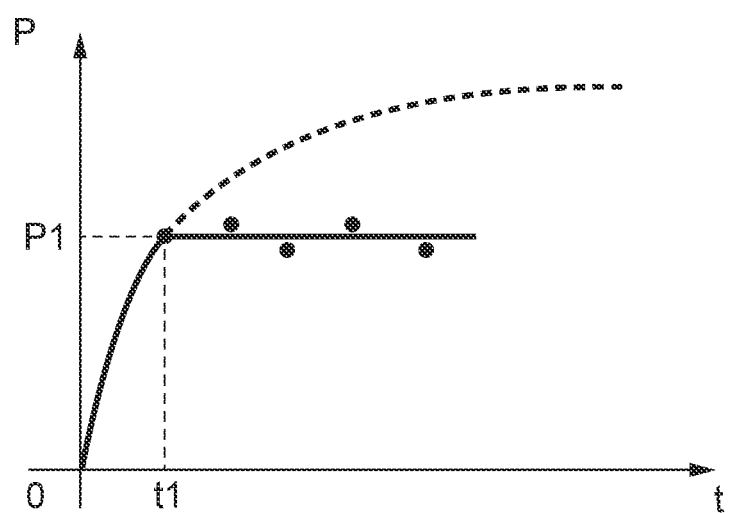
FIG. 4 is a graph indicating a relationship between elapsed time after closing an atmospheric air open valve and pressure in an enclosed space formed by a flow passage and a pressurization flow passage, in a method of driving a pump according to a second embodiment of the present disclosure.

As indicated in FIG. 4, the pump 30 is driven only for a short time, and then stopped, whereby a great increase in the pressure in the enclosed space V1 is circumvented. The pressure sensor 32 measures the pressure in the enclosed space V1 more than once in such a state, whereby plural values are detected as the pressure in the enclosed space V1 at the time of the lapse of the predetermined time t1. The measurement error of the pressure sensor 32 can be reduced by using a pressure which is the arithmetic mean of the values as pressure P1 at the time of the lapse of the predetermined time t1. Since time for which the pump 30 is driven can be set to a short time period (i.e., a constant time length), a burden on the pump 30 can be reduced.

A method of adjusting the flow rate of air fed to liquid tanks 52 by the pump 30 with the use of the pressure P1, and the effect of the adjustment are similar to those in the first embodiment, and descriptions thereof are omitted. The same applies to each of embodiments described below.

In the first or second embodiment, a time lag may occur between the time of closing the atmospheric air open valve 34 and the time of starting an increase in the pressure in the enclosed space V1. For example, in a case in which the atmospheric air open valve 34 is controlled under an environment having a low temperature, behavior of closing the atmospheric air open valve 34 may be slower than that in a case in which the atmospheric air open valve 34 is controlled under an environment having a high temperature. In such a case, it is preferable to preliminarily operate the atmospheric air open valve 34 before starting the measurement of the pressure in the enclosed space V1.

Figure 10:
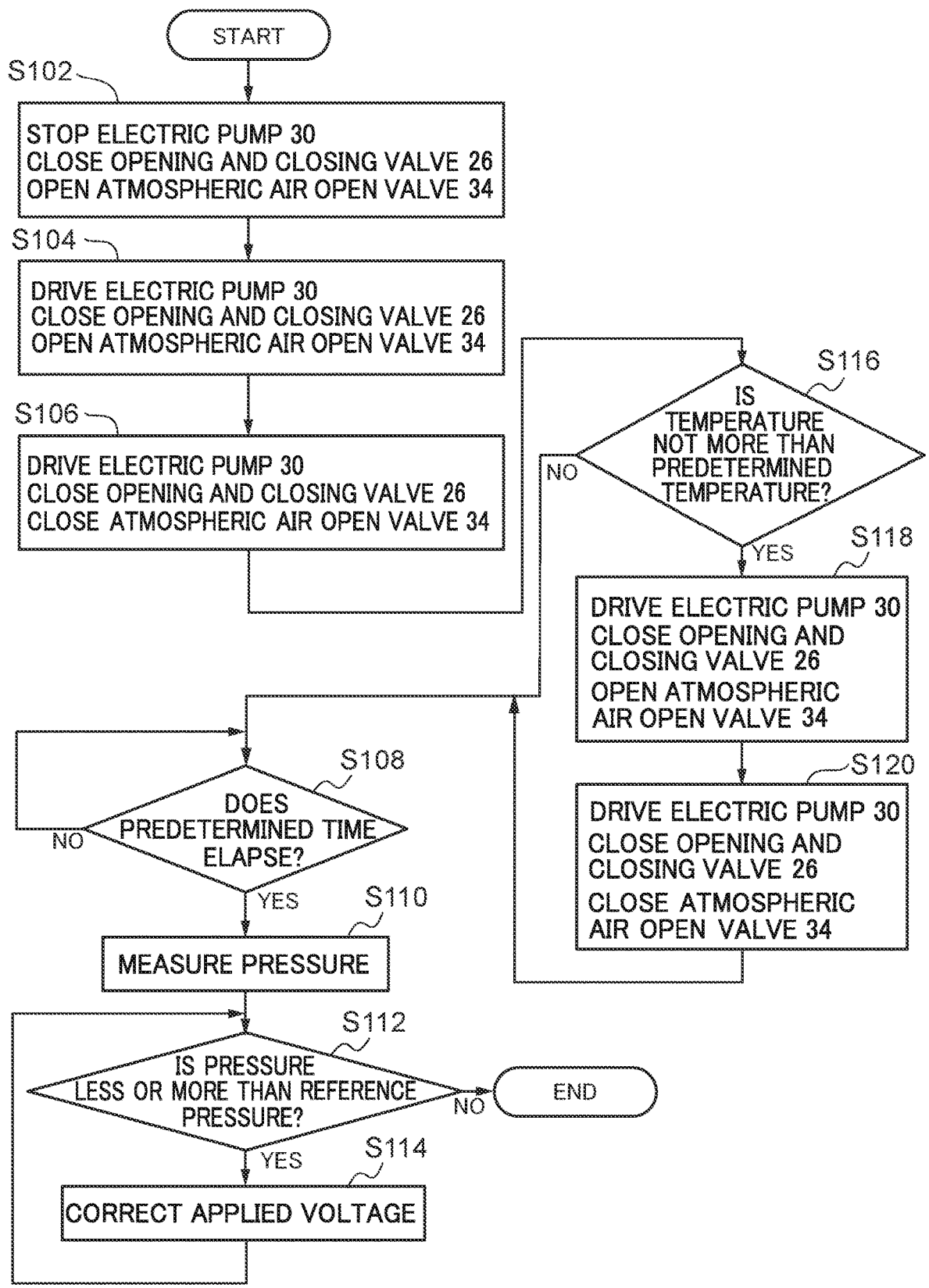
FIG. 10 is a flowchart indicating an alternative example in which a pump is preliminarily operated prior to measurement of pressure in a method of adjusting a pump according to an embodiment of the present disclosure.

An increase in the pressures of the interiors of a flow passage 22 and the pressurization flow passages 24 is started in a case in which the opening and closing valves 26 of pressurization flow passages 24 are closed, and the atmospheric air open valve 34 is closed in the state of driving the pump 30 (step S106 in FIG. 10), as described above. In such a case, the procedure goes to step S116, and it is determined whether a temperature is not more than a predetermined temperature, as illustrated in FIG. 10, before the lapse of predetermined time for which the pressure in the enclosed space V1 is measured by the pressure sensor 32, i.e., before going to step S108. In a case in which the temperature is higher than the predetermined temperature, no preliminary operation is performed, and the procedure goes to step S108. In a case in which the temperature is not more than the predetermined temperature, the procedure goes to step S118, the atmospheric air open valve 34 is opened, the pressure in the enclosed space V1 is allowed to be zero, the procedure goes to step S120, and the atmospheric air open valve 34 is closed. Then, the procedure goes to step S108.

Variations in time lag, or the occurrence of a time lag can be suppressed by performing, at least once, the preliminary operation in which the atmospheric air open valve 34 is closed and then opened to allow the pressure in the enclosed space V1 to be zero, as described above. The preliminary operation of the atmospheric air open valve 34 in step S118 may be performed without performing the determination by the temperature measurement in step S116.

Third Embodiment

In the third embodiment, in a case in which such a time lag as described above occurs, the time lag is calculated, and the occurrence of an error in the measurement value of pressure is suppressed.

Figure 5:
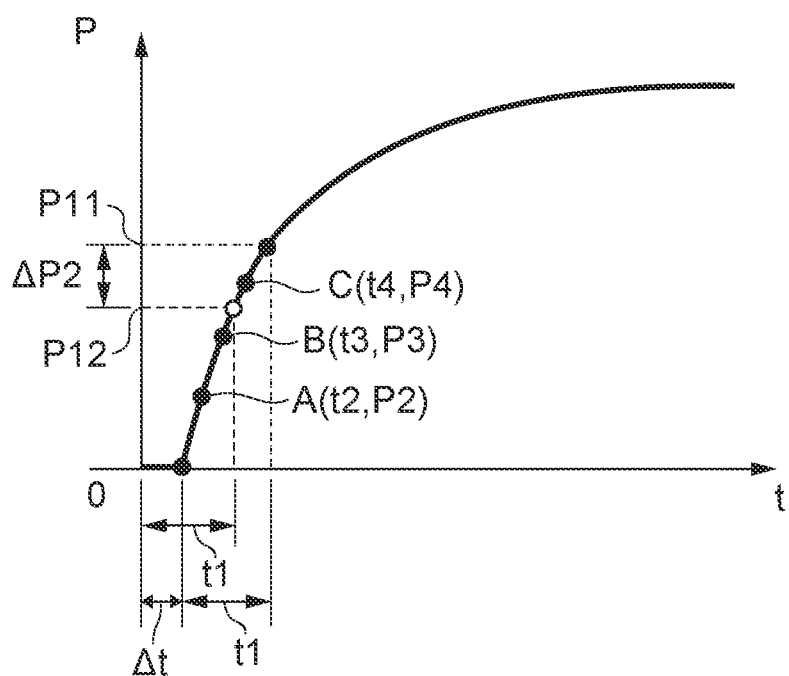
FIG. 5 is a graph indicating a relationship between elapsed time after closing an atmospheric air open valve and pressure in an enclosed space formed by a flow passage and a pressurization flow passage, in a method of driving a pump according to a third embodiment of the present disclosure.

An error $\Delta P2$ occurs between pressure P12 in an enclosed space V1 at the time of an elapse of predetermined time t1 after closing an atmospheric air open valve 34 (after t=0) and pressure P11 in the enclosed space V1 at the time of the lapse of the predetermined time t1 after starting an increase in pressure in the enclosed space V1 in a case in which a time lag $\Delta t$ occurs between time at which the atmospheric air open valve 34 is closed, and time at which the increase in the pressure in the enclosed space V1 is started, as illustrated in FIG. 5. P11 is equivalent to the value of the pressure in the enclosed space V1 at the time of the lapse of the predetermined time t1 in a case in which no time lag $\Delta t$ occurs.

Since the time lag $\Delta t$ varies depending on the temperature of a surrounding environment, the specifications of a circuit of controlling the atmospheric air open valve 34, and the like, it is preferable to use the pressure P11 in the enclosed space V1 at the time of the lapse of the predetermined time t1 after starting the increase in the pressure in the enclosed space V1, rather than to use the pressure P12 in the enclosed space V1 at the time of the lapse of the predetermined time t1 after closing the atmospheric air open valve 34, in order to evaluate a pump 30. The influence of the time lag $\Delta t$ can be eliminated by using the pressure P11.

Thus, in a method of driving a pump according to the third embodiment, a pressure sensor 32 measures the pressure in the enclosed space V1 more than once in a state in which the pressure in the enclosed space V1 continues to increase while driving the pump 30. The time lag $\Delta t$, i.e., time required from the closing of the atmospheric air open valve 34 to the start of the increase in the pressure in the enclosed space V1 is calculated from these plural measurement values.

Specifically, for example, the gradient of pressure P with respect to time t $(P3-P2)/(t3-t2)$ is calculated from the respective (time t, pressure P) values (t2, P2) and (t3, P3) of two measurement points A and B indicated in FIG. 5, and the relationship between the time t and the pressure P is approximated to a linear function, to estimate the value of $\Delta t$. Alternatively, for example, the relationship between the time t and the pressure P is approximated to a quadratic function from the respective (time t, pressure P) values (t2, P2), (t3, P3), and (t4, P4) of three measurement points A, B, and C indicated in FIG. 5, to estimate the value of $\Delta t$.

An optional approximate curve can be calculated to estimate $\Delta t$ by, e.g., conducting the linear approximation, polynomial approximation, or power approximation, or deriving the moving average, of a relationship between time t and pressure P with the use of the values of the times t and pressures P of two or more measurement points, as described above.

As a result, the pressure P12 in the enclosed space V1 at the time of the lapse of the predetermined time t1 after starting the increase in the pressure in the enclosed space V1 can be estimated. The pressure in the enclosed space V1 at the time of the lapse of the predetermined time t1 after starting the increase in the pressure in the enclosed space V1 can be detected with great precision by presuming the time at which the increase in the pressure in the enclosed space V1 is started, even in a case in which the time lag $\Delta t$ occurs between the time at which the atmospheric air open valve 34 is closed and the time at which the increase in the pressure in the enclosed space V1 is started, according to the method of driving a pump according to the third embodiment, as described above.

A method of eliminating the influence of the time lag $\Delta t$ is not limited to the present embodiment. For example, the gradient of a pressure change (a derivative in the function of the pressure P, represented using time t) may be calculated by recording an increase in pressure after a point (measurement point A) at which the pressure in the enclosed space V1 arrives at predetermined pressure (pressure P2). The condition of the operation of the pump can be adjusted by comparing this calculation value and a reference value. In other words, it is determined that it is necessary to adjust the pump 30, in a case in which the gradient of the pressure change after the pressure in the enclosed space V1 arrives at the predetermined pressure (pressure P2) is more or less than the reference.

Fourth Embodiment

Like the method of driving a pump according to the third embodiment, a method of driving a pump according to a fourth embodiment can be applied in a case in which a time lag occurs between time at which an atmospheric air open valve 34 is closed and time at which an increase in pressure in an enclosed space V1 is started.

Figure 6:
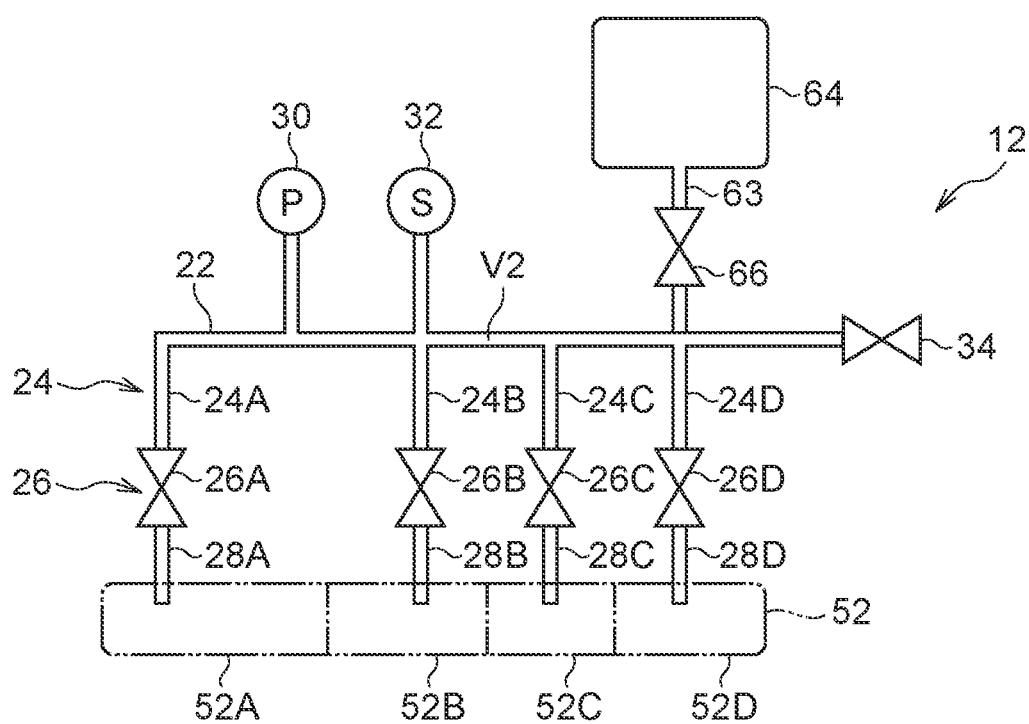
FIG. 6 is a configuration view illustrating a pressure-applying apparatus to which a method of driving a pump according to a fourth embodiment of the present disclosure is applied.

The basic structure of a pressure-applying apparatus 12 to which the method of driving a pump according to the fourth embodiment is applied is common to the basic structure of the pressure-applying apparatus 10 according to the first embodiment illustrated in FIG. 1. As illustrated in FIG. 6, the pressure-applying apparatus 12 further includes an adjustment flow passage 63 connected to a flow passage 22; an enclosed air chamber 64 communicating with the adjustment flow passage 63; and an adjustment valve 66 that opens and closes the adjustment flow passage 63. The flow passage 22 and pressurization flow passages 24 are allowed to communicate with the enclosed air chamber 64 by opening the adjustment valve 66. As a result, an enclosed space V2 including the flow passage 22, the pressurization flow passages 24, the adjustment flow passage 63, and the enclosed air chamber 64 is formed. Therefore, the volume of the enclosed space V2 is greater than that of the enclosed space V1 in the pressure-applying apparatus 10 of each of the first to third embodiments.

In the method of driving a pump according to the fourth embodiment, the adjustment valve 66 is opened in the case of driving a pump 30, and the enclosed space V2 is formed in the case of closing the atmospheric air open valve 34.

Figure 7:
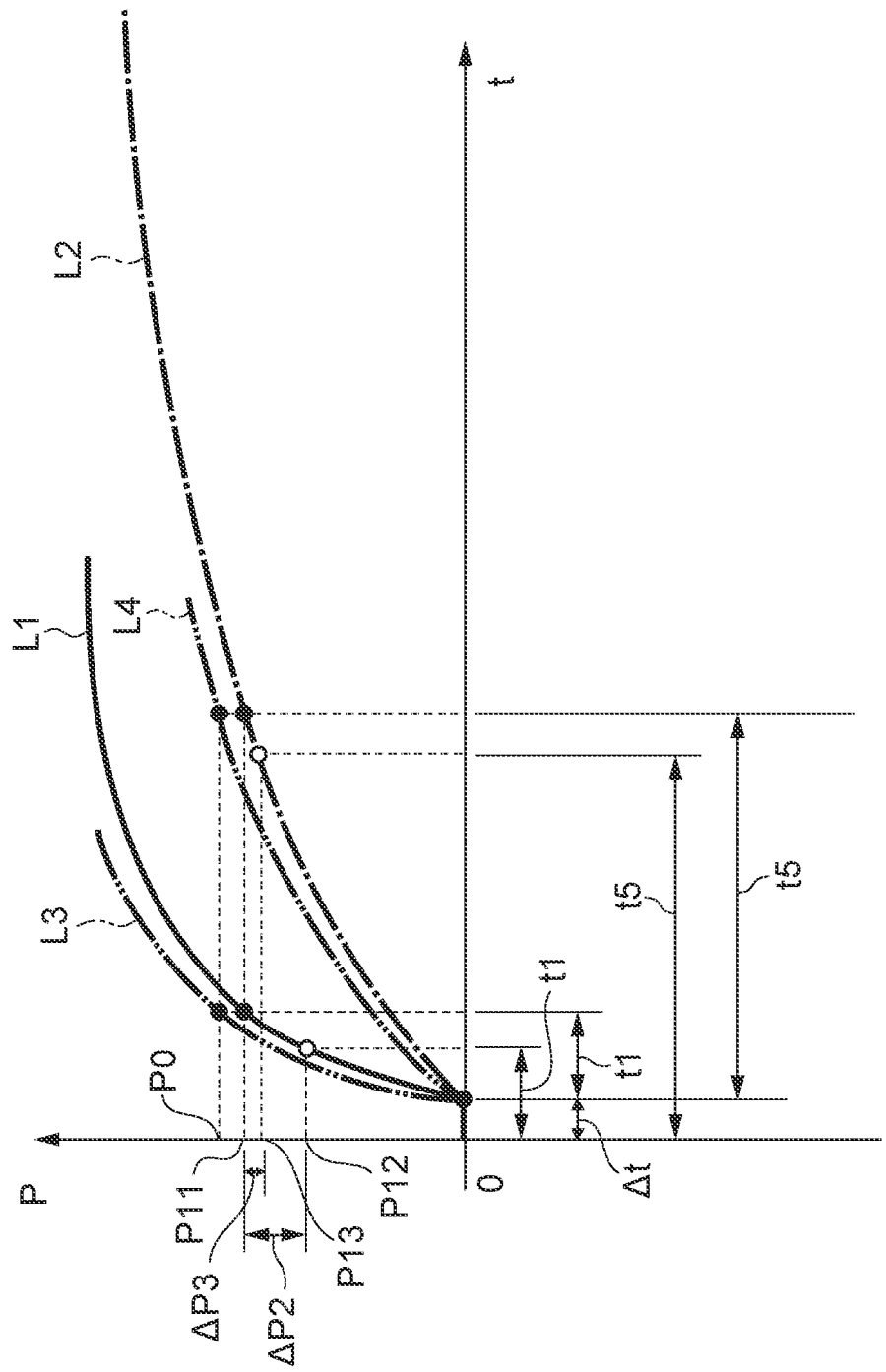
FIG. 7 is a graph indicating a relationship between elapsed time after closing an atmospheric air open valve and pressure in an enclosed space formed by a flow passage and a pressurization flow passage, in the method of driving a pump according to the fourth embodiment of the present disclosure.

In FIG. 7, in the case of deviation from a normal value, the pressure in the enclosed space V1 in the pressure-applying apparatus 10 according to the third embodiment is indicated by a continuous line L1, and the pressure in the enclosed space V2 in the pressure-applying apparatus 12 according to the fourth embodiment is indicated by an alternate long and short dash line L2. In contrast, the pressures of the enclosed spaces V1 and V2 in a case in which the pump 30 is operating normally are indicated by chain double-dashed lines L3 and L4, respectively.

Since the volume of the enclosed space V2 is greater than that of the enclosed space V1, the pressure increase speed of the enclosed space V2, indicated by a chain double-dashed line L4, is lower than the pressure increase speed of the enclosed space V1, indicated by a chain double-dashed line L3. Therefore, in a case in which the pump 30 is operating normally, time t5 from the start of the increase in the pressure in the enclosed space V2 to arrival at predetermined pressure P0 is longer than the time t1 from the start of the increase in the pressure in the enclosed space V1 to arrival at the predetermined pressure P0.

A time lag $\Delta t$ occurs between a time at which the atmospheric air open valve 34 is closed and a time at which the increase in the pressure in the enclosed space V1 or V2 is started. Therefore, an error ($\Delta P2=P11-P12$) occurs between the pressure P12 in the enclosed space V1 at the time of the lapse of the predetermined time t1 after closing the atmospheric air open valve 34 (after t=0) and the pressure P11 in the enclosed space V1 at the time of the lapse of the predetermined time t1 after starting the increase in the pressure in the enclosed space V1, as indicated by the continuous line L1. Similarly, an error ($\Delta P3=P11-P13$) occurs between pressure P13 in the enclosed space V2 at the time of a lapse of the predetermined time t5 after closing the atmospheric air open valve 34 (after t=0) and pressure P11 in the enclosed space V2 at the time of the lapse of the predetermined time t5 after starting the increase in the pressure in the enclosed space V2, as indicated by the alternate long and short dash line L2.

A speed at which the pressure in enclosed space V2 is increased is lower than a speed at which the pressure in the enclosed space V1 is increased. Therefore, the error $\Delta P3$ between the pressure measurement values due to the time lag $\Delta t$ is less than $\Delta P2$.

In the method of driving a pump according to the fourth embodiment, the increase in the pressure in the enclosed space V2 is allowed to be slower by allowing the enclosed air chamber 64 to communicate with the flow passage 22 to increase the capacity of the enclosed space, as described above. As a result, the error $\Delta P3$ between the pressure P13 in the enclosed space V2 at the time of the lapse of the predetermined time t5 after closing the atmospheric air open valve 34 and the pressure P11 in the enclosed space V2 at the time of the lapse of the predetermined time t5 after starting the increase in the pressure in the enclosed space V2 can be reduced even in a case in which the time lag $\Delta t$ occurs between the closing of the atmospheric air open valve 34 and the start of the increase in the pressure of the enclosed space V2.

Therefore, the pressure P13 in the enclosed space V2 at the time of the lapse of the predetermined time t5 after closing the atmospheric air open valve 34 can be used as the approximate value of the pressure P11 in the enclosed space V2 at the time of the lapse of the predetermined time t5 after starting the increase in the pressure in the enclosed space V2.

Other Embodiments

As illustrated in FIG. 3, the pressure P1 after the lapse of the predetermined time t1 after starting the increase in the pressure in the enclosed space V1 is evaluated in the first embodiment. However, the embodiments of the present disclosure are not limited thereto. For example, the evaluation may be performed using a time t6 until the pressure in the enclosed space V1 arrives at the predetermined pressure P0.

In a case in which the time t6 is later than the time t1 of arriving at the predetermined pressure P0 in a case in which the pump 30 is operating normally, it is determined that it is necessary to adjust the pump 30, or the pump 30 is degraded (third step), and a voltage applied to the pump 30 is corrected to adjust the pressure, or the pump is exchanged. In a case in which the time t6 is earlier than the time t1, it is also determined that it is necessary to adjust the pump 30 (third step), and a voltage applied to the pump 30 is corrected (fifth step). The third step is an example of evaluating the state of the pump based on a time of the present disclosure, while the fifth step is an example of adjusting the driving condition of the pump based on the state of the pump evaluated according to the time of the present disclosure.

In each embodiment of the first to fourth embodiments, the applied voltage E represented in (Equation 2) is corrected to adjust the flow rate Y of the pump 30 at a time of normal operation. However, the embodiments of the present disclosure are not limited thereto. The flow rate Y may be adjusted, for example, by adjusting the time of driving the pump 30 rather than by adjusting the applied voltage E. In other words, the longer time of driving the pump 30 results in the more flow rate Y, while the shorter time of driving the pump 30 results in the less flow rate Y.

In each embodiment of the first to fourth embodiments, the method of adjusting the flow rate of the pump 30 is described. However, the embodiments of the present disclosure are not limited thereto. For example, in a case in which a deviation between pressure measured in a pressure detection part and reference pressure is more than a threshold value, it is determined that an error occurs, and an error signal may be output to a measurement apparatus, to stop the driving of the pump 30. In this case, it may also be determined that the pump 30 is degraded, and a signal indicating the determination may also be output to the measurement apparatus.

As illustrated in FIG. 1 and FIG. 6, the four pressurization flow passages 24 (pressurization flow passages 24A to 24D) are formed in each embodiment of the first to fourth embodiments. However, the embodiments of the present disclosure are not limited thereto. At least one pressurization flow passage 24 is acceptable. In the case of one pressurization flow passage 24, the flow passage 22 and the pressurization flow passage 24 can be integrally formed using the same pipe body. In such a case, the number of the liquid tanks 52 as pressure supply units can also be increased or decreased, if appropriate, depending on the number of the pressurization flow passages 24.

In each embodiment of the first to fourth embodiments, the liquid tanks 52 formed in the analysis tool 42 in which electrophoresis of a sample is performed are used as the pressure supply units that supply pressure to the pump 30. However, the embodiments of the present disclosure are not limited thereto. For example, in the case of, e.g., mixing a sample in an analysis apparatus in which electrophoresis is not used, a portion in which the sample is enclosed may be used as a pressure supply unit.

The viscosity of the liquid LA such as a dilution liquid or a migration liquid, enclosed in the liquid tanks 52, may vary depending on the environmental temperature of an environment in which the pressure-applying apparatus 10 is placed. For example, the viscosity of the liquid LA becomes high in a case in which the environmental temperature is low, while the viscosity of the liquid LA becomes low in a case in which the environmental temperature is high. Therefore, the amount of liquid LA pushed out by air varies depending on the environmental temperature even in a case in which the amount of air fed from the pump 30 is allowed to be constant.

In a case in which the environmental temperature is high, the sample may be excessively stirred by optimizing the flow rate of air caused by the pump 30 for the liquid LA having a high viscosity. In a case in which the environmental temperature is low, the optimization of the flow rate of air caused by the pump 30 for the liquid LA having a low viscosity may result in the insufficient amount of fed liquid.

The flow rate of the pump 30 may be adjusted depending on the environmental temperature in order to eliminate variations in stirring performance and liquid feeding performance due to the environmental temperature, as described above. Specifically, the environmental temperature is added as a parameter to the (Equation 1) described above, the environmental temperature is measured by a temperature sensor (sixth step), and the applied voltage is adjusted so as to decrease the flow rate of the pump 30 in a case in which the environmental temperature is high or so as to increase the flow rate of the pump 30 in a case in which the environmental temperature is low (seventh step). The sixth step is an example of measuring an environmental temperature of an environment of the present disclosure, while the seventh step is an example of adjusting the driving condition of the pump based on the environmental temperature of the present disclosure. Alternatively, the flow rate of the pump 30 may be adjusted with reference to the correlation data of the environmental temperature and the liquid sending performance. The measurement of the environmental temperature can be performed at optional timing, for example, before opening the atmospheric air open valve 34, before driving the pump, or before measuring pressure. As a result, precision with which the pump 30 is driven can be enhanced. The environmental temperature of the liquid LA can be appropriately measured by placing the temperature sensor that measures temperature, for example, on the placement unit 122 (see FIG. 2) on which the analysis tool 42 is put. As described above, the embodiments of the present disclosure can be carried out in various aspects.

What is claimed is:

1. A method of driving a pump, the method being used in a pressure-applying apparatus including:
    a flow passage;
    the pump configured to impart pressure into the flow passage by feeding air into the flow passage;
    an opening and closing valve that is disposed in the flow passage, and that is configured to open and close the flow passage;
    a pressure detector configured to detect pressure in the flow passage; and
    an atmospheric air open valve that is disposed in the flow passage, and that is configured to open an interior of the flow passage to atmospheric air, and
    the method comprising:
        feeding air into the flow passage by driving the pump while maintaining a state in which the opening and closing valve is closed and the atmospheric air open valve is opened;
        subsequently closing the atmospheric air open valve while continuing to feed air by driving the pump; and
        evaluating a state of the pump, based on one of:
            the pressure detected by the pressure detector at a time at which a predetermined time period has elapsed after closing the atmospheric air open valve while continuing to drive the pump; and
            an elasped time from closing of the atmospheric air open valve while continuing to drive the pump until detection of a predetermined pressure by the pressure detector.

2. The method of driving a pump according to claim 1, wherein
    the evaluating the state of the pump is based on the pressure and includes calculating a flow rate of air discharged from the pump based on the pressure detected by the pressure detector.

3. The method of driving a pump according to claim 1, wherein
    the evaluating the state of the pump is based on the pressure and includes determining that an error has occurred when a deviation between the pressure detected by the pressure detector and a reference pressure is more than a threshold value.

4. The method of driving a pump according to claim 1, wherein
the evaluating the state of the pump is based on the pressure and includes stopping the pump at a time at which a predetermined time has elapsed, and detecting the pressure more than once by the pressure detector.

5. The method of driving a pump according to claim 1, wherein
the evaluating the state of the pump is based on the pressure and includes
detecting the pressure in the flow passage by the pressure detector more than once, and
estimating an estimated time at which an increase in the pressure in the flow passage started based on a change of measurement value with respect to time.

6. The method of driving a pump according to claim 1, wherein the pressure-applying apparatus further includes:
an adjustment flow passage that is connected to the flow passage, and that is configured to communicate with an enclosed air chamber; and
an adjustment valve that is disposed in the adjustment flow passage, and that is configured to open and close the adjustment flow passage, and
wherein, the driving the pump includes operating the pump in a state in which the adjustment valve is opened.

7. The method of driving a pump according to claim 1, further comprising adjusting a driving condition of the pump based on the state of the pump as evaluated by the evaluating the state of the pump based on the pressure.

8. The method of driving a pump according to claim 7, wherein the driving condition of the pump is a voltage applied to the pump.

9. The method of driving a pump according to claim 7, further comprising:
measuring an environmental temperature of an environment in which the pressure-applying apparatus is placed; and
adjusting the driving condition of the pump based on the environmental temperature.

10. The method of driving a pump according to claim 1, wherein
the pressure-applying apparatus is placed in an analysis apparatus configured to analyze a diluted sample, and
the flow passage is connected to a liquid tank in which a dilution liquid is enclosed, and
the driving the pump supplies the pressure to the liquid tank to push the dilution liquid out of the liquid tank to dilute the sample.

* * * * *